UNITED STATES PATENT OFFICE.

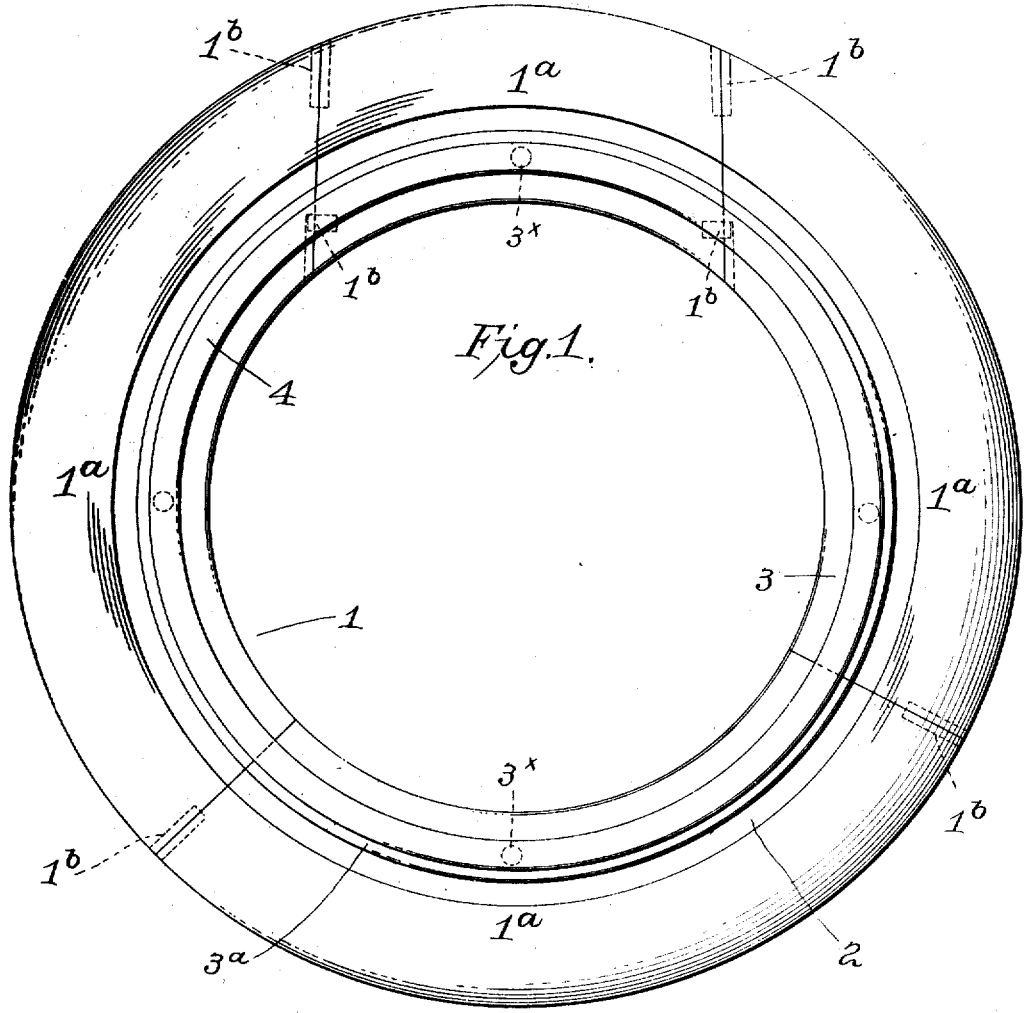
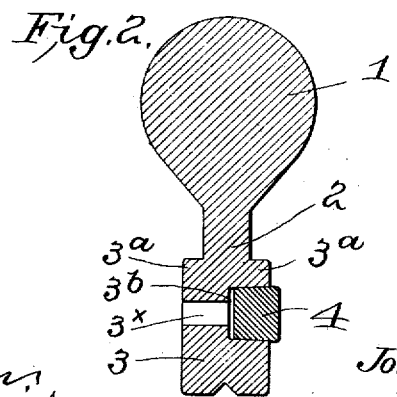

JAMES H. NESBITT AND JOHN C. LAURITZEN, OF AKRON, OHIO; ASSIGNORS, BY DIRECT AND MESNE ASSIGNMENTS, OF ONE-THIRD TO SAID LAURITZEN AND TWO-THIRDS TO THE WILLIAMS FOUNDRY AND MACHINE COMPANY, OF AKRON, OHIO, A CORPORATION OF OHIO, (ORGANIZED IN 1917.)

SEPARABLE CORE.

1,297,226.      Specification of Letters Patent.      Patented Mar. 11, 1919.

Application filed March 6, 1913. Serial No. 752,464.

*To all whom it may concern:*

Be it known that we, JAMES H. NESBITT and JOHN C. LAURITZEN, citizens of the United States, residing at Akron, Ohio, have invented certain new and useful Improvements in Separable Cores, of which the following is a specification.

Our present invention relates to improvements in separable cores or mandrels for manufacturing the outer casings or shoes of double tubed pneumatic tires having inextensible edges.

The invention has among others for its objects to provide a construction in which the number of parts shall be reduced to a minimum and be capable of being quickly and easily assembled and which, when so assembled, will be held firmly together and in accurate alinement without the use of bolts or similar clamping devices.

With these and other objects in view, the invention includes the novel features of construction and arrangement and combination of parts hereinafter described and particularly defined by the appended claims.

A core constructed in accordance with our invention is illustrated in the accompanying drawings, in which—

Figure 1 is a side elevation of the assembled core, and

Fig. 2 is a section taken on a radial line through one of the openings.

In the particular embodiment of our invention illustrated in the accompanying drawings, the core includes an annulus formed of a plurality of sections 1$^a$ and comprising a main body portion having its outer portion 1 substantially circular in cross section, and an inwardly extending flange 2 having an enlarged marginal portion 3 providing shoulders 3$^a$, substantially perpendicular to the side faces of flange.

Abutting ends of the sections are preferably provided with interlocking tongues and grooves 1$^b$ and one of the sections preferably tapers outwardly so that when the locking, or retaining ring, to be hereinafter described, is removed this section may be forced inwardly radially for collapsing the annulus.

The shoulders 3$^a$ of the enlarged portion, when the parts are in the assembled condition, form complete annular abutments or flanges which shape the edges of the tire and coöperate with the mold sections in the manner well understood by those skilled in the art.

The enlarged portion is provided in one side with an annular groove or channel 3$^b$ which is designed to receive a ring 4. Either the channel or the ring, or both, is formed more or less of wedge-shape in cross section, and the ring is thus adapted to be driven into the groove or channel when the sections have been assembled in core form with the groove or channel uppermost. We prefer that the complemental inner side walls of the ring and channel shall be inclined, or beveled, as shown in the accompanying drawing.

When the core is to be removed from the tire the ring may be readily removed by driving it out through the instrumentality of a suitable tool insertible in one or more openings 3$^x$, which are spaced apart from one another and extend transversely through the flange from the bottom wall of the channel 3$^b$ to the opposite face of the flange to that through which the channel opens.

By our construction above described, it will be seen that we have reduced the construction to a minimum of simplicity and number of parts, as we have only one part besides the core sections and that a simple metal ring; thereby greatly reducing the cost of manufacture.

We have also greatly facilitated the assembling and separating of the core, as we have eliminated all bolts and nuts, or other similar securing devices, and enabled the parts to be locked in assembled form and unlocked for separating by the mere driving of the wedge ring into the groove and the reverse action of driving it out respectively.

Having thus described our invention what we claim is:

1. A core of the character described comprising a plurality of separable sections having inwardly extending portions provided with grooves, which, in the assembled condition of the sections, provide an annular channel and an annular locking ring adapted to be forced into and out of said channel by a substantially direct axial movement and to be retained in locking position by frictional engagement.

2. A core adapted to have tire shoes or casings built and vulcanized thereon, and consisting of an annular sectional member provided with a channel opening out through one face thereof and an annular ring adapted to be held in said channel and be retained therein by frictional contact of one wall thereof with a contiguous wall of the channel and to be dislodged from the channel by pressure applied in a direction parallel to its axis at spaced apart points.

3. A core of the character described comprising a plurality of separable sections having inwardly extending portions provided with grooves which, in the assembled condition of the sections, provide an annular channel, and an annular wedge ring insertible in said channel and adapted to be held therein by friction.

4. A core of the character described comprising a plurality of separable sections having interlocking ends and inwardly extending portions provided with grooves which, in the assembled condition of the sections, provide an annular channel, and an annular wedge ring insertible in said channel and adapted to be held therein by friction.

5. A core of the character described comprising a plurality of separable sections having tongue and grooved ends, and inwardly extending portions provided with grooves which, in the assembled condition of the sections, provide an annular channel, an annular wedge ring insertible in said channel and adapted to be held there by friction, there being openings through the core at the base of said channel for driving out the wedge ring.

6. A core adapted to have tire shoes, or casings, built and vulcanized thereon, said core comprising an annulus formed of a plurality of sections and having surfaces for coöperating with a retaining member to hold the sections in annular formation and a single detachable retaining member shiftable by a substantially direct movement, in a direction co-axially of the core, into and out of clamping engagement with said surfaces thereof.

7. A core adapted to have tire shoes, or casings, built and vulcanized thereon, said core comprising an annulus formed of a plurality of sections and including an inwardly extending flange having a channel therein opening out through one face of the same and a single member for holding the sections in annular formation, said member comprising a ring adapted to be forced within the channel by a substantially direct movement co-axially of the annulus and coöperating with the walls thereof for holding the sections in annular formation.

8. A core adapted to have a tire built and vulcanized thereon, said core including an annulus comprising an outer main body and an inwardly extending flange, the annulus being formed of a plurality of sections arranged end to end and one of the sections tapering outwardly, said flange having an annular channel therein opening out through one face of the same, one of the side walls of the channel being inclined to the axis of the annulus and an endless tapered ring adapted to be forced within the channel by a direct movement substantially co-axial of the annulus for retaining the sections of the annulus in annular formation.

9. A core adapted to have tire shoes and casings built and vulcanized thereon, said core including an annulus comprising an outer main body and an inwardly extending flange having an enlarged marginal portion providing shoulders perpendicular to the faces of the flange, said annulus being formed of a plurality of sections and said enlarged portion of the flange having a channel therein opening out through one of the side faces of the same and also being provided with spaced apart openings leading from the bottom wall of said channel through the opposite face of said enlarged portion and a ring adapted to be forced into said channel as and for the purpose described.

In testimony whereof, we affix our signatures in presence of two witnesses.

JAMES H. NESBITT.
JOHN C. LAURITZEN.

Witnesses:
J. K. WILLIAMS,
WM. FRANZ.